United States Patent [19]

Zoltner

[11] Patent Number: 4,904,333

[45] Date of Patent: Feb. 27, 1990

[54] DECORATIVE BINDING APPARATUS

[75] Inventor: John D. Zoltner, Rochester, N.Y.

[73] Assignee: Xerox Corporation, Stamford, Conn.

[21] Appl. No.: 748,061

[22] Filed: Jun. 24, 1985

[51] Int. Cl.[4] .............................................. B32B 31/00

[52] U.S. Cl. .................................... 156/479; 156/483; 156/484; 156/908; 412/36

[58] Field of Search ............... 156/212, 216, 443, 479, 156/483, 484, 485, 227, 908; 412/4, 5, 8, 19, 36

[56] References Cited

U.S. PATENT DOCUMENTS 2,911,659 11/1959 Robbins .............................. 156/908

3,518,143 6/1970 Führ .................................... 156/212

3,920,501 11/1975 Carlton ............................... 156/364

3,953,277 4/1976 Kuhns ................................ 156/360

4,240,867 12/1980 Diegel ................................ 156/216

*Primary Examiner*—George F. Lesmes

*Assistant Examiner*—J. Davis

*Attorney, Agent, or Firm*—William A. Henry, II

[57] ABSTRACT

A tape binding apparatus for applying decorative tape to a previously stapled booklet is disclosed as having a pair of binding surfaces upon which a piece of tape is placed after being drawn from a tape dispenser attached to one end of the apparatus. A manually operable device drives one of the surfaces toward the other surface when the bound edge of the booklet is applied to the surfaces. A pivotal guide mechanism is arranged to guide the booklet to the surfaces.

1 Claim, 5 Drawing Sheets

DECORATIVE BINDING APPARATUS

The present invention relates to decorative binding apparatus, and in particular, to devices which apply to a decorative strip along a previously stapled/stitched or adhesive bound booklet.

Bookbinding apparatus in general use today are for binding booklets of the type which apply a heat adhesive strip to an edge of a stack of sheets to be bound and utilize a heated platen to melt the strip to cause adhesive binding of the stack. In these arrangements, the strip itself becomes the binding medium. These apparatus are relatively costly and complicated, require heating devices, temperature controls, pressure applying devices, storage and handling of the relatively thick binding strips and other related devices attendant to the needs of applying hot melt material to the stack.

Typical of adhesive strip binding apparatus is disclosed in U.S. Pat. No. 3,788,921 which utilize the separate heated platens. These platens requiring a heating period for binding and means for moving the same into contact with an adhesive strip to be applied. While not disclosed specifically, but mentioned parenthetically, these heating elements require a source of electric power circuitry and temperature regulating devices, etc.

Another binding apparatus is disclosed in U.S. Pat. No. 3,460,173 and includes many more complicated features to the conventional type. Such apparatus includes a jogger and a pivotal housing carrying a heater and timing means for controlling the energization of the heater for a requisite length of time. A compressor is included to and in the high compressing of the sheets needed to effect adequate binding.

A more compact and efficient bookbinding apparatus is disclosed in U.S. Pat. No. 3,953,277, but is still of the heated platen type and needs all of the usual attendant devices which make up a hot melt binding appartus. Such items include motor drives, clamping plates and a timing circuit. In all of the above-cited references, hot melt timing is necessary and therefore seriously affects throughput in the event high speed and high volume production is necessary.

In the present invention, advantage is taken of the presence in the market of high speed and high volume duplicators having on-line stapling/stitching apparatus associated therewith. Such in-the-market duplicators as the 9900® Xerox Duplicator are adapted to staple booklets up to 80 sheets and apply two staples along and parallel to an edge of collated copy sets. The staple binding of these copy set booklets is adequate for the purpose and retention, if desired, of the booklets, the only disadvantage being in the aesthetic appearance of the finished booklet. For more formal distribution of the booklet and perhaps longer than usual record retention, the exposed stapled edge with unsightly staples showing may not be acceptable. The present invention provides an arrangement which applies a decorative and/or informative binding to the stapled edge of the booklet, covering both the edge and the staples. In this end, the present invention includes an edge holding device adapted to support a strip or tape of conventional self-sticking adhesive material and means for applying the tape to the flat edge of the booklet and both adjacent surfaces of the same to cover up both exposures of the staples applied to the booklet. All of the operative steps for binding the booklet is carried out manually and in a manner of seconds of time. In addition, the tape does serve another functional purpose in that the top and bottom sheets of a stapled set are joined with an integral hinge which is less likely to pull away from staple(s). The tape is also much more durable than copy paper and can be carried and handled without damage to a bound edge.

Therefore, it is the principal object of the present invention to effect binding of booklets, which have been previously double stapled, in simple steps, all of which are manually accomplished, and in a very short period of time.

It is another object of the present invention to apply decorative adhesive binding strips to stapled booklets using a minimum of parts, operative steps, and cost.

These and other objects will become apparent after reading the following description taken in conjunction with the accompanying drawings wherein.

Figure 2:
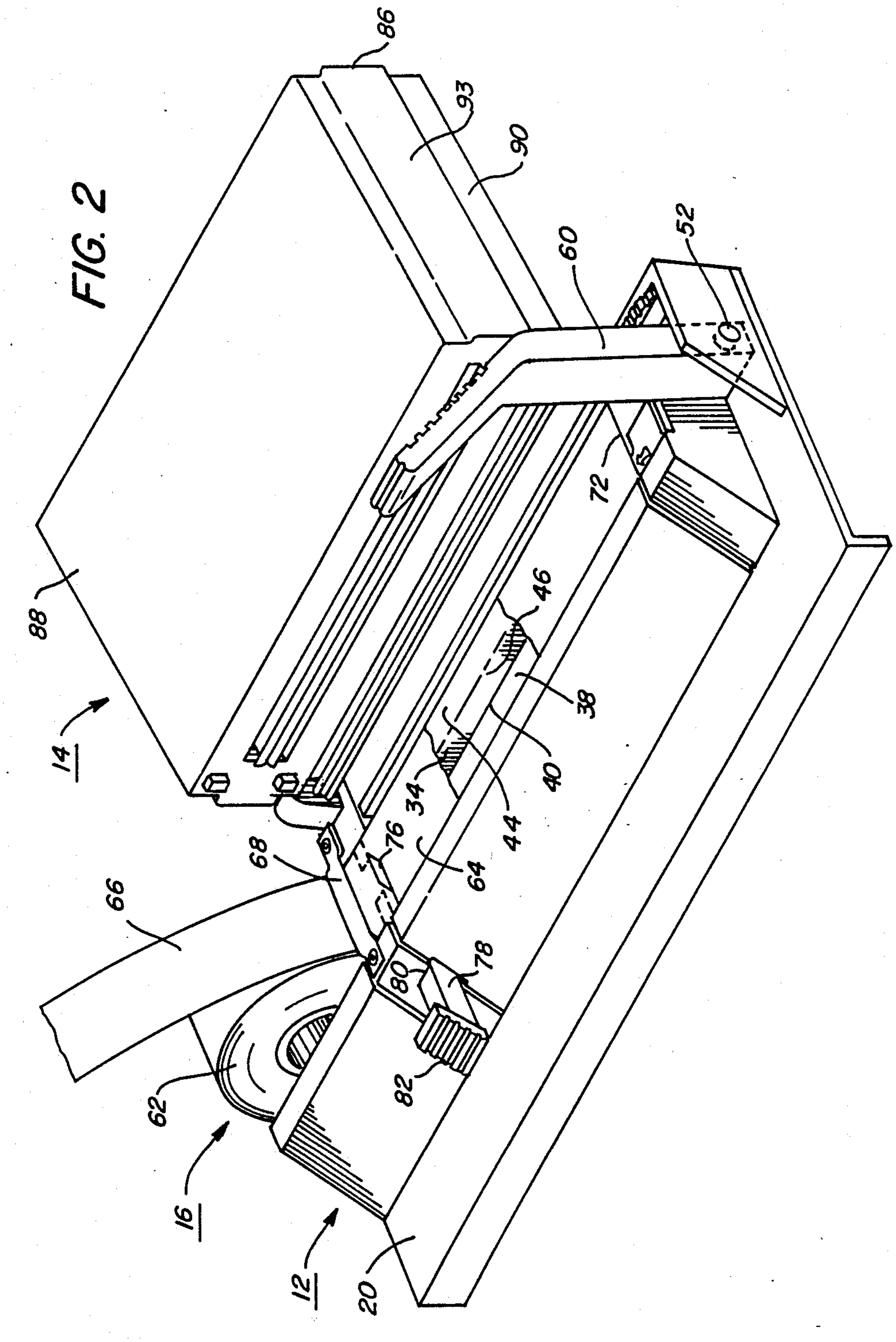
FIG. 2 is a perspective view of the apparatus with the booklet holding device pivoted out of the way to expose the holding arrangement.
Figure 2A:
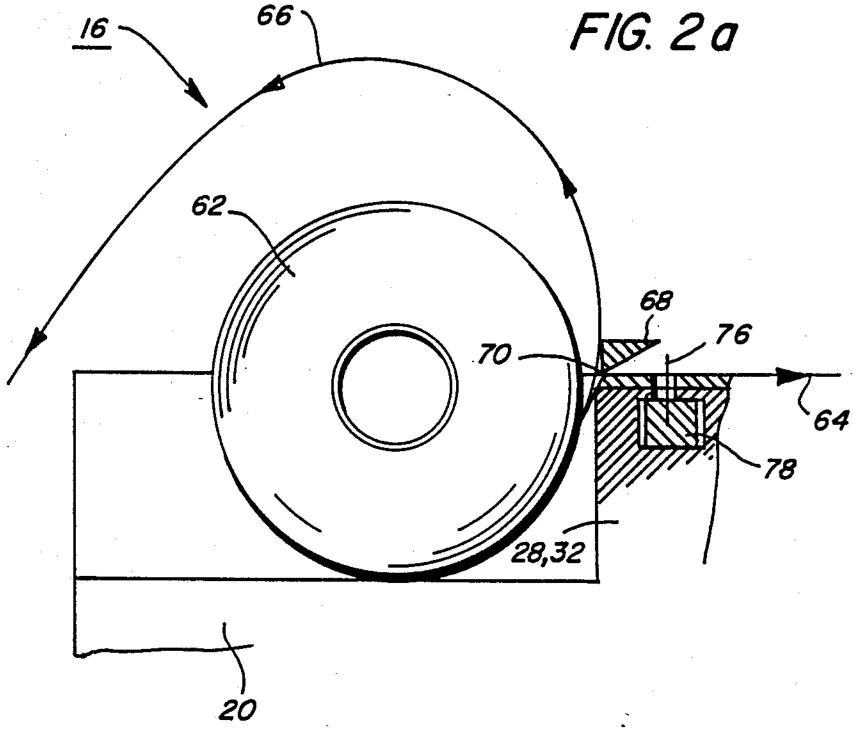
Figure 3:
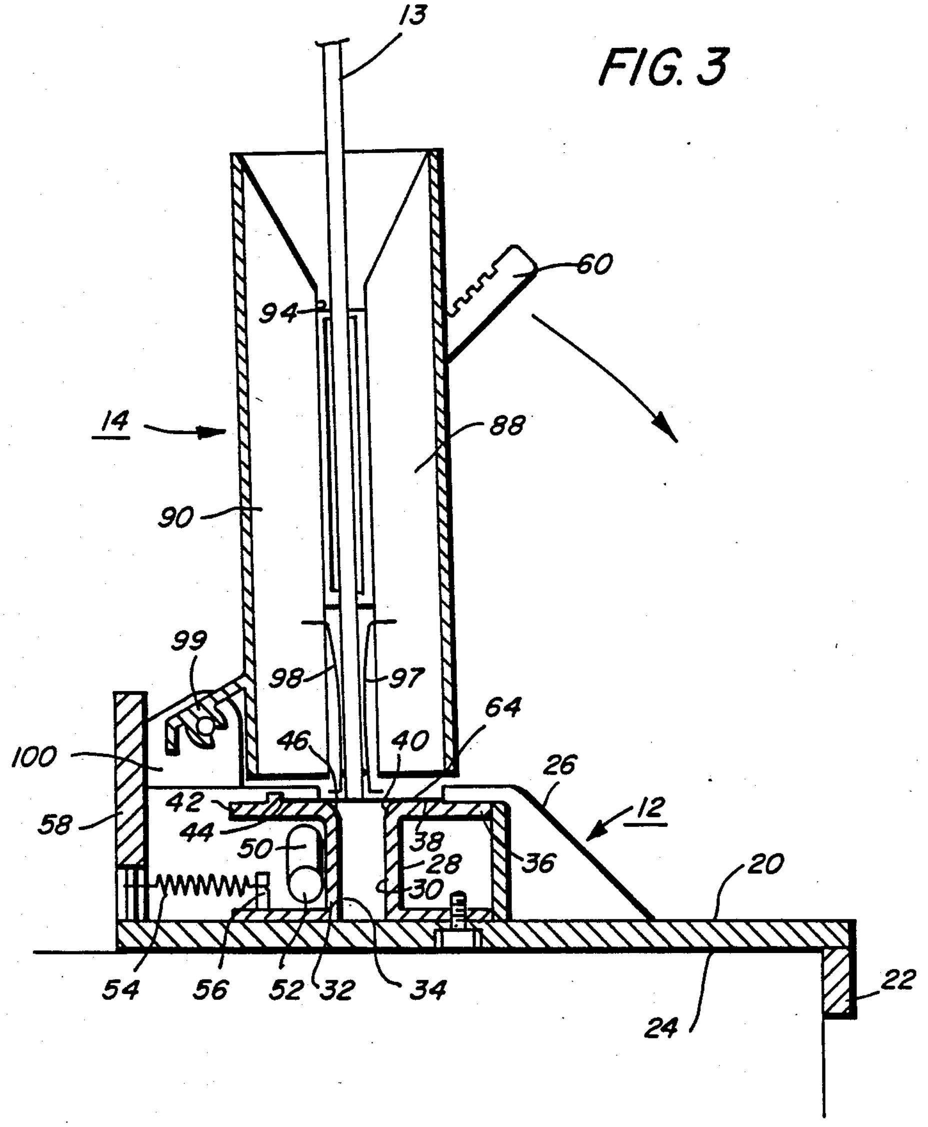
Figure 4:
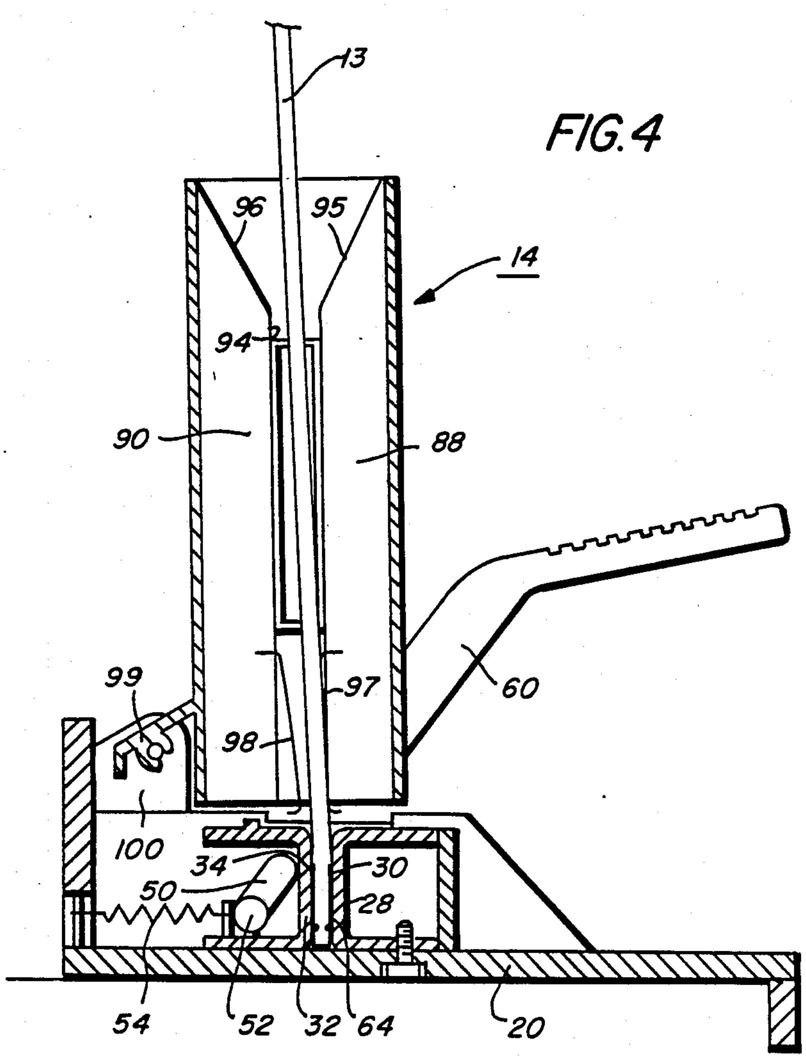

FIG. 2*a* is a partial elevational view of the apparatus showing details of the tape dispensing means;

FIG. 3 is a cross-sectional view of the apparatus taken on a line transverse thereto and in one position of operation; and FIG. 4 is a cross-sectional view of the apparatus similar to that of FIG. 3 but during another position of operation.

Figure 1:
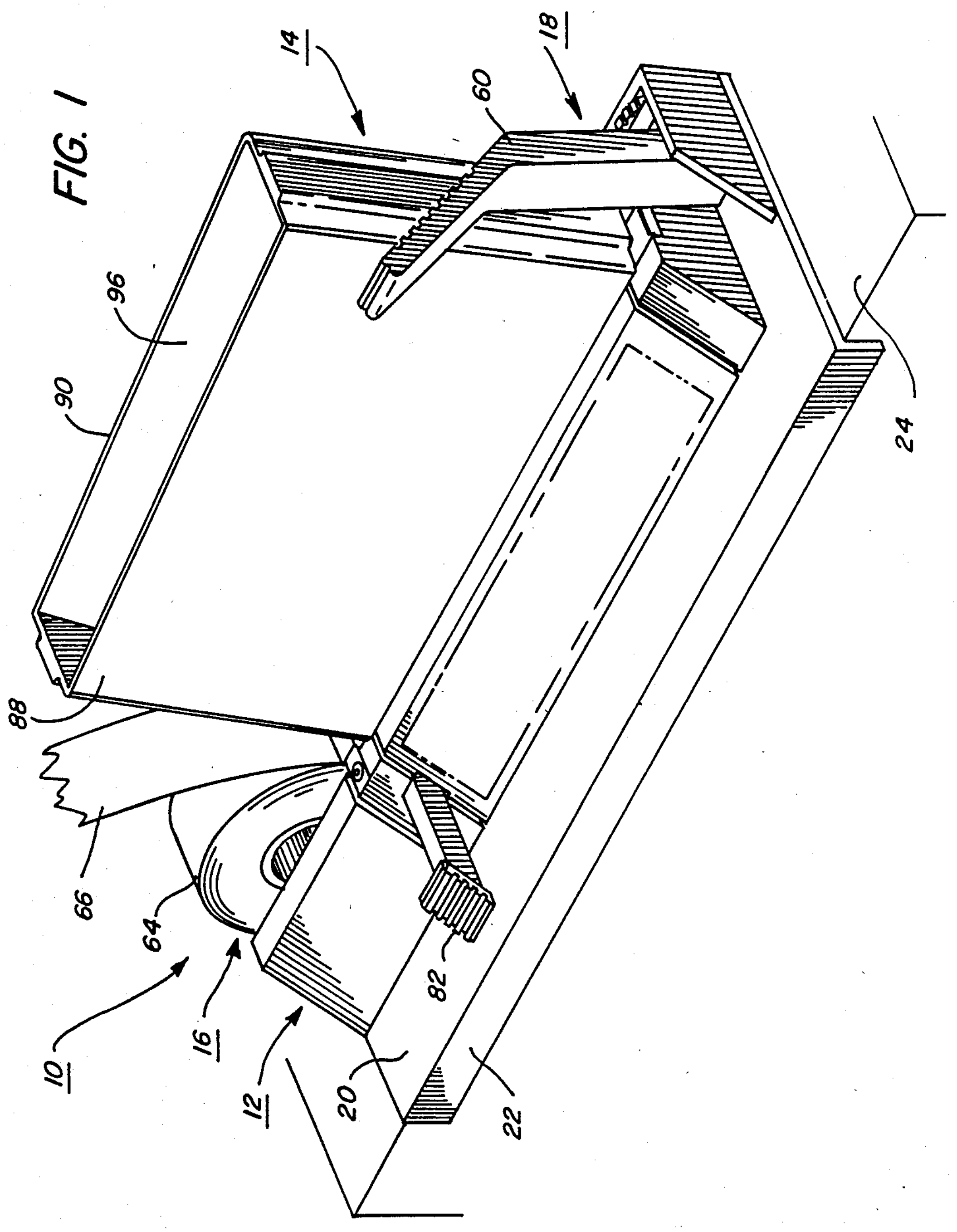
FIG. 1 is a perspective view of an adhesive binding apparatus in accordance with the present invention.

The booklet binding apparatus of the present invention is indicated in FIG. 1 generally by the reference numeral 10 which comprises a base 12, a booklet guiding device 14, a tape dispensing device 16 and a pressure applying device 18.

The base 12 includes a base plate 20 joined by a narrow strip 22 at the forward edge and adapted to support the apparatus upon a suitable table top indicated by the line 24. The strip 22 serves to prevent the apparatus 10 from sliding backward on the table top. Positioned upon the base plate 20 and supported thereby, is a frame structure 26 which extends along the length of the base plate. Within the frame structure 26 is positioned a fixed pressure channel member 28 extending almost the full length of the frame 12 and being formed with a pressure surface 30 arranged in a plane perpendicular to the top plane of the base plate 20. Also positioned within the frame 12 is a channel member 32 generally of the same shape as the member 28 and being spaced therefrom a distance slightly larger than the thickest booklet for which the apparatus 10 is adapted to operate upon. The movable channel member 32 is provided with a movable pressure surface 34 which extends almost the length of the frame 12 parallel to the surface 30. A channel-shaped fixed member 28 is also formed with a flange 36 having a surface 38 arranged perpendicular to the pressure surface 30 and connected thereto around a curved surface 40. Similarly, the movable channel member 32 is formed with a flange 42 having an outer surface 44 positioned in the same plane as the plane of the surface 38. A curved corner surface 46 connects the surface 34 with the surface 44.

Movement of the channel member 32 toward the fixed channel member 28 and consequently the pressure surface 34 toward the pressure surface 30 is effected by a link cam 50 arranged within the channel member 32 and secured to a shaft 52 extending along the length of the member 32 and mounted for rotation within the end plates of the frame 12 (not shown). As shown in FIG. 3, the cam link 50 is positioned in an inoperative condition whereby the member 32 is in its left-most position being normally held therein by a spring 54 held in tension between a post 56 secured to the member 32 and a rear plate structure 58 for the frame 12. Rotation of the shaft 52 clockwise as viewed in FIG. 3 to position the cam link 50 to its other position of operation as shown in FIG. 4, will move the pressure surface 34 toward the pressure surface 30. Such rotation of the shaft 52 is provided by a manually operable handle 60 secured to the outboard end of the shaft as shown in FIG. 2.

In FIG. 3, the handle 60 is shown in its uppermost position to permit the spring 54 to maintain the movable member 32 at its left-most position and its furthest distance from the member 28. In FIG. 4, the handle 60 is shown in its lowermost operative position wherein the member 32 has been moved toward the member 28 during an adhesive tape binding application.

The tape dispensing device 16, as shown in FIG. 2, is positioned within the frame structure 12 at one end thereof and is adapted to contain a roll of binding tape roll 62 of the type which comprises soft adhering tape 64 and a strip of non-adhering strip material 66 against which the tape 64 is applied during non-use when the tape roll 62 is or remains in its coiled orientation. Upon use by the operator, the roll tape 62 is unraveled from the host coil and prior to use of the tape 64, the strip 66 is removed therefrom thereby presenting the adhesive material on the tape 64 exposed for application to a workpiece. The tape roll 62 may be conventional tape purchasable at a hardware or stationery store.

As shown in FIG. 2*a*, one end of each of the channel members 28, 32, terminate adjacent the roll 62. To facilitate the separation of the backing strip 66 from the tape 64, a stripper bar 68 is secured adjacent the ends of the members 28, 32, and slightly above the surfaces 38, 44. The bar 68 is separated from the adjacent surfaces 38, 44 to form a narrow slot 70 through which the tape 64 is directed manually by the operator after separating the strip 66 therefrom. It will be apparent that continued movement of the tape 64 in the direction of the arrow will unwind the roll 62 with continuing separation of the tape 64 from the backing strip 66, the latter being directed upwardly and away from the apparatus 10 and may be occasionally torn by the operator to prevent interference thereby, or directed into a waste receptacle.

As shown in FIG. 2, the tape 64 has been extended across the length of the frame 12 to provide a section upon the surfaces 38, 44 of the channel members 28, 32, respectively. While being so pulled during this operative step, the backing strip 64 will be separated from the tape leaving the adhesive side thereof facing upwardly as viewed in the drawings. The tape is so manually applied to the surfaces 38, 44 by the operator who then places the end of the tape adjacent a line 72 which is indicative of the termination of the usable portion of the tape as will be seen hereinafter. Actually, the line 72 is an edge of a movable metal 'tape stop' plate which is a raised edge for aligning the end of the tape and means for tape length adjustment. When the end of the tape 64 is positioned against the line 72, the tape may be cut at the other end positioned on the surfaces 38, 44 which is illustrative of the working end of the other end of the tape. This other end of the tape is defined by the working path of a cutter blade 76, which is arranged for cutting movement transversely of the tape so as to complete the section of the tape ready for a binding operation. The cutter blade 76 is mounted on a rod 78 reciprocably, slidably mounted within the frame structure 12 and exiting therefrom through a complimentary opening 80 and terminating in a manually operable handle 82. Means, not shown, provided in the structure 12, may be utilized to slidably hold the rod 78 for reciprocal sliding action transverse of the channel members 28, 32. The section of the tape 64 between the cutting thereof by the blade 76 to the line 72, defines the working tape to be applied to a booklet in accordance with the objects of the present invention.

The booklet guiding device 14 comprises a frame structure 86 defined by side panels 88, 90 and connecting end members 92, 93. The side panels 88 and 90 are arranged parallel to each other and are spaced apart in the longitudinal middle of the frame 86 to define an elongated slot 94 through which booklets B may be manually inserted for a binding operation. To facilitate manual insertion of a booklet within the guiding device 14, the upper ends of the side panels 88, 90, are provided with suitable tapered surfaces 95, 96 so as to form entry guiding surfaces for the insertion.

At the lower end of the guiding device 14 adjacent the tape applying area are one or two opposing spring biasing plates 97, 98 attached to the lower ends of the panels 88, 90, respectively. The spring guiding plates 97, 98, are arranged to provide opposing surfaces between which is much smaller than the width of the guiding slot 94 and by position adjacent the bottom edge of the guiding device 14 will provide final guidance of the movement of a booklet B into a tape binding position. The spring plates will hold the spine of the booklet at adjacent edges thereof in position for the binding operation.

The guiding device 14 is adapted to be pivoted from the book binding position shown in FIG. 1 to the position shown in FIG. 2 wherein at new section of tape 64 may be presented for operation for the next binding operation. As shown in FIG. 3, the device 14 is provided with an extension 99 pivotally related to upstanding flanges 100 secured to the frame 12 along the rear edge thereof. As shown in FIGS. 3 and 4, the guiding device 14 is adapted to be positioned in its working arrangement wherein the lower end of the slot 64 between the panels 88, 90 are directly above the space between the surfaces 30 and 34 of the channel members 28, 32, respectively.

While the invention has been described with reference to the structure disclosed, it is not confined to the details set forth, but is intended to cover such modifications or changes as may come within the scope of the following claims.

I claim:

1. A tape binding apparatus for applying a section of paper-backed tape along the spline and adjacent side edges of a stapled/stitched/adhesive bound set of sheets comprising:

a base having two opposing gripping surfaces at least one of which being moveable toward and away from the other against which the side edges adjacent the spline of the set is placed, means for moving said one surface toward and away from said other surface, a tape dispenser positioned at one end of said base containing self-adhering adhesive tape being arranged for the manual playing out of the tape by the operator adjacent said surfaces for the length thereof, and means associated with said tape dispenser for stripping the tape from its paper backing during playing out thereof, means mounted on said base for cutting the tape after the same has been played out to the length of the spline to be applied, means for manually guiding the spline of a set of sheets toward and against the strip of tape and between said surfaces whereby upon movement of said one surface toward the other applies pressure to the tape against said adjacent edges of the set.

* * * * *